United States Patent [19]
Kleiner

[11] Patent Number: 4,610,808
[45] Date of Patent: * Sep. 9, 1986

[54] CONDUCTIVE RESINOUS COMPOSITES

[75] Inventor: Lothar W. Kleiner, Mentor, Ohio

[73] Assignee: Mitech Corporation, Willoughby, Ohio

[*] Notice: The portion of the term of this patent subsequent to Dec. 25, 2001 has been disclaimed.

[21] Appl. No.: 499,319

[22] Filed: May 31, 1983

Related U.S. Application Data

[63] Continuation-in-part of Ser. No. 399,483, Jul. 19, 1982, abandoned.

[51] Int. Cl.$^4$ .............................................. H01B 1/06
[52] U.S. Cl. ................................ 252/512; 252/513; 252/518; 252/519; 252/520
[58] Field of Search ............... 252/500, 511, 512, 513, 252/518, 519; 524/439, 440, 441, 430

[56] References Cited

U.S. PATENT DOCUMENTS

| | | | |
|---|---|---|---|
| 2,761,854 | 9/1956 | Coler | 260/38 |
| 3,491,056 | 1/1970 | Saunders et al. | 260/41 |
| 3,708,387 | 1/1973 | Turner et al. | 161/68 |
| 3,867,315 | 2/1975 | Tigner et al. | 252/512 |
| 3,919,122 | 11/1975 | Tigner | 252/512 |
| 4,138,369 | 2/1979 | Arai et al. | 252/512 |
| 4,230,604 | 10/1980 | Wingrave | 252/518 |
| 4,382,024 | 5/1983 | Seamon et al. | 252/511 |
| 4,490,283 | 12/1984 | Kleiner | 252/512 |

FOREIGN PATENT DOCUMENTS 0038679 10/1981 European Pat. Off. .
0062252 3/1982 European Pat. Off. .

OTHER PUBLICATIONS

Mukhopadhyay, Journal of Applied Polymer Science 20, pp. 2575-2580 (1976).
Bhattacharyya et al., Polymer Engineering and Science 19, pp. 533-544 (1979).
Applicant's copending U.S. patent application Ser. No. 238,757, filed Feb. 27, 1981 and Ser. No. 332,000 filed Dec. 18, 1981.

*Primary Examiner*—Josephine L. Barr
*Attorney, Agent, or Firm*—John P. Hazzard

[57] ABSTRACT

This invention is directed to resinous compositions which are generally metal-filled and which also contain hard filler materials. This combination produces unexpectedly better electrical conductivity than metal-filled material without the hard filler materials. Meanwhile there can be retained the resinous composition's ability to be quickly fabricated by simple molding technique into structurally sound rigid articles which are electrically conductive.

21 Claims, No Drawings

CONDUCTIVE RESINOUS COMPOSITES

CROSS-REFERENCE TO RELATED APPLICATION

This application is a continuation-in-part of copending U.S. application Ser. No. 399,483 filed July 19, 1982, now abandoned.

BACKGROUND OF THE INVENTION

Conductive plastic compositions have been well received as desirable raw materials for the fabrication of a variety of specialized accessories and components, including static electricity dissipation devices, electrical heating elements, equipment parts for high frequency protection and/or electromagnetic interference (EMI) shielding and a variety of other electrical components such as electrodes, terminals, connectors, and the like.

Thermosetting or heat-curable polymer systems have been most prominent in the majority of such conductive plastics materials which have been developed so far. For certain electrical applications, the resistance of many thermosetting materials to high temperature service conditions is a major consideration. However, a generally more important factor probably resides in the inherent reactivity responsible for their thermosetting character and which tends to increase the polymeric interaction with the finely subdivided conductive solids (e.g., metallic powders, carbon blacks, and the like) that must be incorporated into the polymeric base material in order to provide appropriate levels of electrical conductivity.

Most thermoplastic resins, on the other hand, are considerably less responsive to additions of finely divided solid fillers, often resulting in an actual deterioration of many structurally significant physical properties when filled with carbon blacks, powdered metals, and the like, to the extent required for practical levels of electroconductivity. Such deficiencies have severely limited applications accessed by conductive thermoplastic compositions, confining them for the most part to fabrication of at least partially supported auxiliary elements and secondary components like seals, gaskets, inserts and electrodes.

In spite of such difficulties, filled thermoplastic systems have, of course, continued to receive attention since rigid thermoplastic resins offer definite advantages over most thermosetting materials in regard to ease of handling, melt processing convenience and the simplicity of fabricating finished articles therefrom by the usual high speed plastic forming techniques such as extrusion, injection molding, and the like. Indicative of approaches which have been taken in an effort to develop metal-filled thermoplastic compositions with improved overall performance and utility are those disclosed in the publications summarized below.

U.S. Pat. No. 3,491,056 to Saunders et al discloses the rare ability of finely divided aluminum powder to strengthen a specialty thermoplastic resin derived from the prescribed copolymerization of ethylene with an unsaturated carboxylic acid such as acrylic acid. It appears, however, that outstanding levels of electrical conductivity were not achieved in this system even with a 50% by volume loading of conductive filler unless some of the fine aluminum powder was replaced with carbon black (e.g., 16% by volume as in Example 7).

U.S. Pat. No. 3,867,315 to Tigner et al is much more concerned with achieving good electrical conductivity levels without excessive volume loadings of the particular metallic filler material. This is accomplished by including various ionic metal salts along with the metallic filler, which is either copper or contains accessible copper. A broad list of thermoplastic resins is recited, but experimental data is presented only for a blend of 2 parts polyethylene with 1 part of a 72/28 copolymer of ethylene and vinyl acetate, and no physical strength properties whatsoever are indicated. A closely related patent is U.S. Pat. No. 3,919,122 to Tigner which deals with substantially the same system except that the ionic salt is a metal halide salt which is formed "in situ" from free metal and a suitable halide source. The preferred halide source is a halogen-containing polymer (notably one derived from vinylidene chloride), with a copolymer of vinyl chloride and vinylidene chloride in respective weight proportions of 27:73 being used in most of the illustrative examples. However, the only metallic filler used in said examples is a brass powder with an average particle size of 5 to 12 microns and, again, no physical strength measurements are presented.

U.S. patent application Ser. No. 238,757 filed Feb. 27, 1981, now abandoned, to Kleiner describes a flame retardant thermoplastic filled with anisometrically shaped aluminum particles in amounts of from 12 to about 40% by volume which exhibit good electroconductivity. However, the ability to maintain the electroconductivity while lowering the amount of aluminum particle filler needed to achieve the desired level of electroconductivity through the addition of a hard low aspect ratio filler is not realized.

Another approach to achieving highly conductive metal-filled plastic composites at very low volume loadings of the metallic filler has been resorted to from time to time in this art. The basics of this approach, which is often referred to as the "segregated metal particle network" technique, is the careful observance of several critical processing conditions in fashioning the finished composite. These conditions generally include dry mixing of rather large granules of organic polymer with much smaller particles of metal and compacting the resulting mixture under pressures and temperatures controlled to cause some coalescence or sintering between neighboring polymeric granules without effecting sufficient melt flow to result in extensive intermingling with the fine metallic particles distributed therebetween. By means of such techniques, highly conductive, compacted metal-polymer composites can be obtained at metal filler loadings below about 10% by volume, due to the resulting preferential segregation of metal particles into extended chain-like networks which apparently serve as a system of three-dimensionally interconnected pathways through which current can flow. Patents describing products made by such techniques include U.S. Pat. Nos. 2,761,854 to Coler and 3,708,387 to Turner et al. Additional descriptions are also found in the basic research literature, including such recent journal articles as:

Journal of Applied Polymer Science 20, pp. 25752580 (1976) by Mukhopadhyay et al and Polymer Engineering and Science 19, pp. 533-544 (1979) by Bhattacharyya et al.

Unfortunately, industrial applications for said products appear to be extremely limited since the associated techniques are totally abhorrent to the high speed, "fused state" mixing and molding operations for which thermoplastic materials are so well suited and for which reason they are usually selected in commercial practice. Furthermore, in view of the inherent heterogeneous nature of such "segregated network" metal-polymer compacts, it is very doubtful that adequate manufacturing uniformity and reproducibility could be achieved for commercial articles except possibly those of the simplest shape and design and least demanding fields of application.

In view of the apparent state of this art, a considerable need continues to exist for improved and more versatile metal-filled polymeric compositions. One of the most challenging raw material requirements in this field resides in the need for conductive thermoplastic molding compounds suitable for forming flame retardant structural members of sufficient size, mass and complexity to serve as electronic cabinet housings, dampers and/or shields for absorbing or blocking out electromagnetic field effects or other high frequency electrical emissions. The region of high frequency generally addressed is that region referred to as the radio frequencies, although protection from interference in this region as well as in the microwave frequency region can also be achieved.

Thus, for example, the computer and auto industries have set guidelines which indicate that materials suitable for cabinet housings and having a shielding effectiveness (SE) of 20 to 30 dB will apparently meet 50% of their needs, while an SE of 30 to 40 dB will apparently meet 95% of their needs. Shielding effectiveness is an absolute ratio normally expressed in decibles (dB) and defined on a logarithmic scale through the following equations $SE = 20 \log (Ei/Et)$ or $SE = 10 \log (Pi/Pt)$ where E is the field strength in volts per unit length, P is the field strength in watts per unit area, i is the incident field and t is the transmitted field. Alternatively, SE can also be expressed on a linear scale as a percent attenuation (PA). PA is simply $(Ei/Et) \times (100)$ or $(Pi/Pt) \times (100)$. Thus, 99% attenuation corresponds to 20 dB, 99.9% to 30 dB and 99.99% to 40 dB. Finally, it should be pointed out that there is often a crude correlation between the shielding effectiveness and the volume resistivity, such that a volume resistivity of lower than 6 ohm-cm *usually* insures that the shielding effectiveness will be at least 20 dB.

It is also understood, however, that this level of shielding effectiveness is not needed for "anti-static" applications and, therefore, lower levels of protection will suffice, for example, volume resistivity levels of less than $1 \times 10^8$ ohm-cm or surface resistivities below approximately $10^9$ ohm/square.

Accordingly, a goal of the present invention is to provide compounds of high electroconductivity. A more specific objective of this invention is to formulate thermoplastic molding compounds of exceptional levels of electroconductivity, while reducing the total amount of metallic filler needed to achieve the desired electroconductivity characteristics. Such molding compounds are particularly needed for certain specialized structural uses, such as EMI shielding members, electronic equipment housings, and the like, and thus represent a preferred embodiment of the present invention.

SUMMARY OF THE INVENTION

Broadly stated, the present invention relates to a resinous composition particularly adapted for preparing electroconductive molded or extruded articles having reduced loadings of finely divided conductive filler, said composition comprising: between about 0.1% and about 40% by volume of said conductive filler in conjunction with from above 0.1 phr to about 15 prh by weight, based on the composition resin, of a finely divided, hard low aspect ratio filler substantially uniformly dispersed within a cementitious, at least predominantly resinous, matrix.

In other aspects, the present invention relates to processes for producing resinous, electroconductive compositions as well as to premix compositions useful in such processes.

DETAILED DESCRIPTION

Resins serve as the principal component of the molding and/or extrusion compounds of the present invention. It is contemplated that these can be any thermosetting or thermoplastic resin which can be blended with particulate substance while in a plasticated uncured or uncross-linked condition. The thermoplastic resins are preferred for quick fabrication by simple molding techniques. Examples of thermoplastic resins which can be blended with particulate substance are: the AAS resins prepared from acrylonitrile, acrylic rubber and styrene, or blends of same with poly(vinyl chloride) and other thermoplastics; the ABS resins prepared from acrylonitrile, butadiene and styrene; blends of ABS resins with other thermoplastics such as, poly(vinyl chloride), poly (alpha methyl styrene) and poly(methacrylic acid); acrylic resins and modified acrylic resins, e.g., poly (methyl methacrylate) and copolymers of styrene and methyl methacrylate; the cellulosic plastics, such as, cellulose acetate, cellulose acetate butyrate, cellulose propionate, ethyl cellulose, cellulose nitrate and mixtures such as of ethyl cellulose plastics; chlorinated polyether; the fluoroplastics, e.g., polytetrafluoro- ethylene, poly (vinylidene fluoride), the fluorinated ethylene-propylene and the chlorotrifluoroethylene plastics; the phenoxy resins; the polyamide resins; the polybutadiene-type resins including butadiene-styrene copolymer and polybutadiene; the polycarbonates; the polyethylene resins, such as, high and low-density polyethylene; copolymers of polyethylene with other materials; chlorinated polyethylenes; chlorosulfonated polyethylenes; ethylene vinyl acetate copolymer; poly (2,6-dimethyl-1, 4-phenylene oxide) based blends; the polypropylenes; the polysulfones; the polyester resins such as poly(butylene terephthalate) resin; the polystyrenes; styrene copolymers; and vinyl polymers and copolymers, such as, poly (vinyl chloride), chlorinated poly (vinyl chloride), and copolymers such as vinyl chloride with vinyl acetate, vinyl chloride with vinyl acetate plus vinyl alcohol and vinyl chloride with vinylidene chloride.

The electroconductive filler materials which are suitable for use in the present invention include metal particles, metalized nonconductive substrate particles, and mixtures thereof. In the case of metal particles, the particles are generally extremely finely divided. Moreover, they typically have a strongly anisometric shape and at least one aspect ratio of over about 10/1. On the other hand, they may have an aspect ratio on the order of 200:1 or 300:1 or more, and with the smallest characteristic linear dimension, which can be thickness or diameter, having a mean value of at least about 0.1 micron, but not over about 100 microns. It is to be understood that metal fibers, metalized nonconductive substrate fibers, mixtures thereof and mixtures with other suitable particulates, e.g., metal powders and flakes, are also suitable electroconductive fillers for use in the present invention. In the case of fibers the smallest characteristic linear dimension is the fiber diameter. Moreover during subsequent processing, such as in blending with other composition components, the aspect ratio can be reduced, e.g., as by a crushing action, such that the aspect ratio for the particles is to be understood as for particles before such processing. Examples of suitable metal particles include, for example, flakes and/or fibers of aluminum, copper, iron, steel such as stainless steel, magnesium, chromium, tin, nickel, zinc, titanium, bronze and alloys and mixtures thereof. Suitable metalized nonconductive substrates include glass beads and/or fibers coated with any of the above, mentioned metals, alloys and mixtures. In addition, mixtures and combinations of the above are possible and in some cases may be advantageous. The electroconductive filler may be present in the composition in an amount up to about 40 volume percent or more, or in an amount of as little as about 0.1 volume percent. More typically such amount for this filler will be within the range from on the order of about 0.2 to 0.3 volume percent up to about 30 volume percent. In general, the lower loading are for fibrous fillers. The invention is of particular interest for compositions containing modest amounts of electroconductive fibers, such as from about 0.2 volume percent, and more generally from about 0.5 volume percent, up to a maximum of about 5 volume percent of such fibers. For such compositions it is not unusual for the amount of the hard filler, by weight, to exceed the weight amount of the conductive filler.

The hard filler material which works synergistically with the finely divided electroconductive filler is used in amounts of from above 0.1 phr (parts per hundred, resin), and more usually from above about 0.2 phr to about 15 phr (parts per hundred, resin), by weight, based on the weight of the cementitious matrix resin. An amount of 0.1 phr can be insufficient for providing enhanced reduction in resistivity. Usually, for economy, the hard filler is present in an amount below about 10 phr. Generally, these fillers are any pigments or coloring oxides or inorganic (multi-valent) metallic salts of the requisite hardness. Such fillers as are most suitable can include individual non-conductive hard low aspect ratio fillers, e.g., $TiO_2$, mixtures of hard low aspect ratio fillers, e.g., $TiO_2$ mixed with $Fe_2O_3$, and mixed metal hard low aspect ratio fillers e.g., $BaTiO_2$. The latter and related materials are referred to herein as "mixed metals oxides," whereas the $TiO_2$ and $Fe_2O_3$ is referred to as a "mixture of metal oxides." The most suitable hard fillers have a Moh hardness number within the range of from above about 4 up to about 10. Useful materials should have a Moh hardness greater than about 3.5, while those within the range of greater than 3.5 up to about 4 are useful especially in mixture with harder fillers.

Low aspect ratio for the hard fillers is meant to convey a ratio of long dimension, or length to short dimension, e.g., thickness (or diameter) of less than about 10:1. Such may often be on the order of about 3 or less, while approaching one for particles of more spherical shape. Moreover, such fillers can have mean minimum characteristic linear dimension, i.e., thickness or diameter, of at least about 0.1 micron and not above about 25 microns. For the more chunky-bodied or block-like fillers, including those of the nature of spheres, it is important that they have mean primary particle diameters of less than 25 microns, and preferably less than about 15 microns, for the most enhanced dispersion of the hard filler in the resin matrix. It is important the this hard filler be very evenly and uniformly dispersed within the cementitious matrix before use. This is discussed more particularly hereinbelow as well as by way of the exemplary teachings. Examples of the suitable hard filler materials include, for example, metal oxides such as from cobalt, aluminum, chromium, iron, zinc, titanium, manganese, antimony, nickel and copper, as well as mixtures of such metal oxides and of mixed metal oxides of the foregoing where such exist. Other suitable hard fillers include silicon oxides, metal carbides, silicon carbide, particulate glass including glass beads, and mixtures of the foregoing. Compounded particles, e.g., compounded metal oxide particles such as disclosed in U.S. Pat. No. 4,373,013, are also contemplated for use. Presently preferred for efficiency and economy are titanium dioxide and mixed metal oxides, e.g., those derived from manganese, antimony, titanium, aluminum, chromium, cobalt and iron. Although the foregoing nonconductive materials are most suitable, it is also known that certain hard, conductive metal particles such as those from the metals of Group VIII, including nickel and nickel/iron alloys can be useful as the hard filler so long as they are in low aspect ratio form. There is, however, the caveat in this situation that said metal particles not also serve as the conductive filler. Regardless of being conductive or nonconductive in the field of use, it is preferred for most efficient dispersion of the hard fillers during processing that they maintain particulate integrity throughout, e.g., in blending and molding and/or extrusion operations. Such fillers are thus preferably inert, and by this is meant that although they may be subjected to some crushing operation in processing, or be electroconductive in finished articles, they nevertheless maintain their particulate nature during processing operations.

In addition to the use of the finely divided electroconductive fillers, hard fillers and the base resins, it may be desirable to include in the cementitious matrix, additional ingredients including lubricants and stabilizers. Lubricants can include solid waxy lubricants such as derived from paraffinic hydrocarbon fractions found in mineral deposits such as petroleum, peat and coal or from essentially aliphatic hydrocarbon polymers such as polyethylene and similar polyolefins, including such materials which have been partially oxidized, animal and plant products such as wool wax and castor wax, as well as various mixtures of any of the same. Examples of waxy lubricants are oxidized polyethylene, ester waxes, polyethylene waxes and amide waxes. Also there may be used fatty acid salts (soaps) such as of magnesium, lithium and/or alkaline earth metals like calcium, strontium and barium. Representative stabilizing compounds can be of Group IVA or VA metals. These stabilizing compounds may be primarily those containing tin, lead or antimony and include their soaps, for example, stearates or octoates and other organic salts, for example, phenolates or maleates. Many different inorganic and/or organic salts of lead, for example, such as sulfates, silicates, phosphites, and phthalates.

Regarding additional ingredients, and after the most important from the point of being advantageous in relatively large amounts, are the polymeric modifiers. Frequently, impact modifiers are the hybrid elastomeric/plastomeric copolymer products formed by graft-type polymerization of one or more suitable monomers from families such as the vinyl aromatics, acrylate monomers and acrylonitriles with a preformed rubbery backbone or elastomeric trunk polymer, particularly the well-known butadiene-containing rubbers. Other nongrafted polymeric impact modifiers are also known, such as, for example, ethylene-vinyl acetate copolymers and chlorinated polyethylenes, and these sometimes can be used in appropriate amounts herein, either alone or together or in combinations with graft copolymers.

Other polymeric modifiers of interest are generally wholly rigid thermoplastic resins, often referred to as "processing aids." These may be added to improve melt flow and/or processability of molding compositions and/or to improve high temperature properties, and include post-chlorinated vinyl chloride resins as well as a wide variety of low to high molecular weight miscible copolymers. Examples of such copolymers are, for example, those of methyl methacrylate with ethyl acrylate and/or of acrylonitrile with styrene and/or alpha-methyl styrene.

Further optional ingredients such as pigments, opacifiers, colorants, u.v. stabilizers, liquid lubricants or plasticizers, syngerists or supplemental stabilizers, inert fillers and the like may also be useful. Inert fillers can include fibrous, reinforcing materials such as fiber glass, graphite and silicon carbide fibers. The total amount of liquid components should be monitored and limited to levels which do not seriously impair either electroconductivity levels or the overall balance of desirable physical properties. For example, to avoid problems of this nature, the total amount of liquid components for use with vinyl resins should not typically exceed about 5% by weight of the total thermoplastic cementitious matrix. Liquid components are those components, as described above, which are liquid at ambient temperatures at normal pressures. It is thus to be understood that the resinous matrix may in some instances be merely resin alone, although such is not preferred so that it will most always include some of the foregoing additional ingredients.

In the present invention where the preparation of thermoplastic molding and extrusion compositions is called for, this can generally be accomplished by adaptively coordinated use of known types of mixing equipment to combine the various components thereof into a homogeneously blended mixture consisting of a fused, resin-based cementitious matrix through which the finely divided electroconductive particles and the finely divided hard filler material are well-dispersed with minimal damage thereto. Once achieved, this homogeneously blended dispersion of electroconductive particles and said hard filler through a continuous, fused mass of said cementitious matrix can be readily converted to compact pellets or granules by the usual plastic compounding techniques such as extrusion pelletizing, chopping, dicing, etc.

To prevent extensive pulverizing or breaking up of said electroconductive particles during their incorporation and dispersion through said matrix, any dry blending operations for combining them with the matrix component should entail relatively mild or low speed agitation systems. It is preferable with the thermoplastic resins, but not critical, to have the particles ultimate thorough incorporation and dispersion through the resin matrix effected by a melt shearing and masticating step during which the resinous components reach a fused state and which is normally near the end of the overall mixing sequence. The characteristic slow speed kneading action of such a step enables said electroconductive particles to be dispersed thoroughly into a softened, viscous, plasticated matrix without extensive damage of their structural integrity. A variety of plasticating and melt shearing equipment is available for such use, including essentially batch type mixing equipment such as Banbury and roll mills as well as essentially continuous mixers such as kneaders and mixing extruders represented by both twin screw devices and certain one and two stage, single screw devices.

Certain of the minor auxiliary components of the present compositions can be introduced at almost any step of the overall mixing sequence. By the same token, certain other minor additives might logically be introduced along with such fillers, such as wetting agents, dispersion aids and/or other processing aids.

However, in the interest of overall production efficiency and economy, it is generally desirable to premix matrix components. Thus, the resin and the hard filler, whether the resin be in pellet or powder form, can be premixed to form a homogeneous blend, before subjecting same to a melt shearing and plasticating step. In such operation, it is preferred to employ downstream addition of electroconductive particles during such plasticating step. Normally, liquid components and at least a major portion of the more significant polymeric modifiers are also generally included in such powder blend premixes. It can also be advantageous for accomplishing uniform dispersion of ingredients to preblend powdered materials in to an admix prior to combination of the admix with the matrix resin. Such powdered admix compositions can include the hard filler along with other very finely divided materials, e.g., impact modifiers, flame retardants and heat distortion temperature modifiers. A minor amount of powdered matrix resin may also be included in such admix.

A wide variety of blending devices known in the art are satisfactory for preparing the powdered admixes or the powder blend premixes from a combination of ingredients. Most efficient of such blenders are the high intensity, rotating blade types, including such commercially available makes as the Henschel Mixer, the Papenmeier Dry Mixer and the Welex Mixers. Due to the high intensity centrifugal action and turbulence created by their rotating blades, these mixers can rapidly create a homogenous powder blend of various particulate ingredients placed therein. A considerable amount of the kinetic energy of such mixers is simultaneously transferred to the ingredient materials as heat through the impacting and shearing performed thereon as well as resultant collisions and impingements within the particulate materials. Such frictional heating may be beneficial, e.g., by softening or melting additional ingredients and assisting in the assimilation of the other ingredients.

Such powdered admixes or the premixes as may contain particulate resin can also be made by less intensive or lower speed powder blending techniques and equipment provided that minimizing the cycle time is not a paramount concern. Such a method is, for example, the mixing of ingredients using a Hobart mixer or a ribbon blender. Supplemental heat, if needed, can be introduced in such cases from an external source, for example, and/or by preheating of the component ingredients, if desirable, for expediting the attainment of a sufficiently homogeneous powder blend.

In order to provide a more complete understanding of the present invention and certain details involved in practicing the same, the following specific examples are provided for illustrative purposes only and without any implication that the specific details disclosed are intended to represent limiting conditions therefor. In said examples, parts and percentages are by weight unless otherwise indicated.

EXAMPLE 1

This example shows how the premix powder blend of matrix components can be produced.

This premix powder blend of matrix components, is used for examples 1 through 6. It contained a rigid PVC suspension type homopolymer with a K value of about 51 as the base resin prepared in accordance with the following formulation. Unless otherwise noted all proportions of each ingredient used are given in parts per 100 parts, by weight, of said PVC.

| Ingredient | Weight Proportion Used |
| --- | --- |
| Tribasic Lead Sulfate | 5.0 |
| Lead Stearate | 1.0 |
| MBS Graft Copolymer[(1)] | 20.8 |
| Wax[(2)] | 5.0 |
| Paraffinic Wax[(3)] | 1.0 |
| Rigid thermoplastic Blending Resin[(4)] | 7.0 |
| PE Wax[(5)] | 0.5 |
| Calcium Stearate | 1.5 |

[(1)]A methyl methacrylate-styrene graft copolymer of a high diene content rubber, supplied by Rohm & Haas under the Trade Name ACRYLOID KM-611.
[(2)]Hydrogenated Castor Oil Base Wax supplied by Associated Lead Inc., under the Trade Name PLASTIFLOW CW-2.
[(3)]Wax 1014 supplied by Boler Petroleum Co.
[(4)]A linear copolymer of acrylonitrile with a major proportion of vinyl aromatic comonomers (predominately alpha-methyl styrene), supplied by Borg Warner under the Trade Name BLENDEX 586.
[(5)]Wax PA-190 supplied by Hoechst.

The blending of said components was accomplished in a high intensity Papenmeier Mixer in the following manner. The lead containing stabilizer compounds were added to the PVC base resin at ambient temperature and mixed for a few minutes until the temperature reached about 49° C. The MBS graft copolymer, combination blend was and the paraffinic wax were charged next, as mixing continues, until the temperature reached about 71° C. At his point the blending resin was charged during continuation of the mixing until the temperature reached 82° C. Finally, the PE wax and calcium stearate were charged and high speed mixing was continued for a few more minutes until the frictional heat generated had raised the temperature of the blended matrix components to about 99° C. The contents were then discharged and cooled, yielding a free flowing, homogeneous powder, hereinafter referred to as the "Matrix Premix".

In the Examples 1 through 6 where samples also contain fillers, e.g., "hard, low aspect ratio fillers", these fillers are introduced into the "Matrix Premix" at the same time as the PE wax and calcium stearate are introduced. In those cases where the Matrix Premixes contain such added fillers, the particular filler and the amount used are described hereinbelow.

EXAMPLE 2

This example describes how to incorporate particles of aluminum flake at various volume loadings in Matrix Premixes using commercial equipment. As shown in the table below, various Matrix Premixes were used, their differences being in the fillers in the Premix, but with the controls being free from such fillers.

The Matrix Premix and the flake of aluminum having a high aspect ratio of typically 40 to 50 were fed from reservoirs via weigh belt feeders to a starve fed hopper. The starve fed hopper in turn introduced the pre-weighed components into the entry end of a dual rotor counter-rotating No. 4 Farrel Continuous Mixer (with #7 rotors at 210 rpm). The TEFLON orifice utilized an discharge opening size of approximately 1.3 inches. The discharge temperature of the mixed material ranged from about 165° C. to about 181° C. The hopper and body of the mixer were run without external heating and the rotors were heated to about 93° C. This material was then fed directly into the entry end of a six inch hot feed extruder with a dry die face pelletizer and the pelletized material was cooled via a fluidized bed system. This extruder had a 1¼" flight screw for feeding and utilized a compression ratio of 1.5:1.

This resulted in a pelletized flame retardant, thermoplastic composition for use in further processing, such as an injection molding machine.

Table A describes the composition of eighteen pelletized samples prepared as described above as well as some properties of the hard low aspect ratio fillers used. Included are control examples having no hard low aspect ratio fillers (samples 2A-2D) and comparison examples that have soft low aspect ratio fillers (samples 2I-2M), or high aspect ratio fillers (samples 2P and 2Q), or have an unusually great mean primary particle diameter (sample 2N). The structural, particulate nickel of sample 2P is recognized for its tendency to readily form agglomerate particles, and is therefore judged to be unsuitable for the present invention owing to its high, effective aspect ratio.

TABLE A

| Sample No. | Aluminum Flake (wt. %) | Filler | Amount (phr) | Mean Primary Particle dia. (u) | Shape and (aspect ratio) | Typical Hardness (Moh) | Resistivity (ohm-cm) |
| --- | --- | --- | --- | --- | --- | --- | --- |
| 2 A* (control) | 0 | — | — | — | — | — | — |
| 2 B (control) | 35 | — | — | — | — | — | — |
| 2 C (control) | 30 | — | — | — | — | — | — |
| 2 D (control) | 25 | — | — | — | — | — | — |
| 2 E | 25 | TiO$_2$[(1)] | 2 | 0.18 | Spherical (low)** | 6-6.5 | $10^{13}-10^{18}$ |
| 2 F | 30 | TiO$_2$[(1)] | 2 | 0.18 | Spherical (low)** | 6-6.5 | $10^{13}-10^{18}$ |
| 2 G | 30 | TiO$_2$[(1)] | 2 | 0.18 | Spherical (low)** | 6-6.5 | $10^{13}-10^{18}$ |

TABLE A-continued

| Sample No. | Aluminum Flake (wt. %) | Filler | Amount (phr) | Mean Primary Particle dia. (u) | Shape and (aspect ratio) | Typical Hardness (Moh) | Resistivity (ohm-cm) |
|---|---|---|---|---|---|---|---|
| 2 H | 30 | TiO$_2$[2] | 2 | 0.03 | — | 6–6.5 | $10^{13}$–$10^{18}$ |
| 2 I (comparison) | 30 | CaCO$_3$[3] | 2 | 0.07 | Block-Like (low)** | 2.5–3 | insulator |
| 2 J (comparison) | 30 | CaCO$_3$[4] | 2 | 0.5 | Block-Like (low)** | 2.5–3 | insulator |
| 2 K (comparison) | 30 | CaCO$_3$[5] | 2 | 3.7 | Block-Like (low)** | 2.5–3 | insulator |
| 2 L (comparison) | 30 | Talc[6] | 2 | 2.5 | Platelet | 1–2 | insulator |
| 2 M (comparison) | 30 | BaSO$_4$[7] | 2 | 10 | Block/Cube (low)** | 3–3.5 | $1 \times 10^{14}$ |
| 2 N (comparison) | 30 | Glass Spheres[8] | 1.5 | 25 | Spherical (low)** | 5.5 | $2 \times 10^{13}$ |
| 2 O | 30 | Nickel[9] Powder | 4 | 3–7 | Spherical (low)** | 5–6 | conductor |
| 2 P (comparison) | 30 | Nickel[10] Powder | 4 | 2.2–2.8 | Structural | 5–6 | conductor |
| 2 Q (comparison) | 30 | Nickel[11] Flake | 4 | 1.2 Thick | Platelet (33:1) | 5–6 | conductor |
| 2 R | 30 | Mixed Metal[12] Oxide | 2 | 1.3 | Spherical (low)** | 6–7 | insulator |

*Typical rigid polyvinyl chloride compound typically has a bulk resistivity of $10^{16}$.
**Low aspect ratio = less than 3
[1]A rutile powder supplied by duPont under the trade designation R101.
[2]A powder, ostensibly primarily anatase, supplied by De Gussa under the trade designation P-25
[3]Pfizer precipitated calcium carbon sold under the Trade Name Ultraphlexate
[4]Pfizer precipitated calcium carbonate sold under the Trade Name Superphlex
[5]Pfizer ground calcium carbonate sold under the Trade Name Hi-phlex
[6]Pfizer talc sold under the Trade Name Platy MP 12-50
[7]Pfizer No. 1 barium sulfate
[8]Potter's Ind. spheres, grade 3,000, silane coated
[9]INCO powdered nickel 123
[10]INCO nickel 255
[11]Novamet nickel flake HCA-1
[12]Shepherd's No. 153 pigment, a mixed metal oxide of Mn, Sb and Ti

EXAMPLE 3

This example shows the high electroconductivity of compositions of the present invention over compositions not containing the "hard filler" materials with sample plaques prepared using commercial injection molding equipment. The sample plaques were made from the corresponding pellets of Example 2 on a 175 ton New Britain Injection Molding Machine. Plaque thickness and bulk resistance are shown below in Table B. Thus, for example, comparative samples 2I–2M containing "soft, low aspect ratio" fillers do not show bulk resistivities as low as samples 2E–2H, containing hard fillers. Also shown is that metal fillers having a low aspect ratio (sample 2O) have some synergistic effect but may not be as serviceable as fillers that are not themselves conductive. Sample 2N contains glass spheres lacking in conductivity but having an unusually great mean primary particle diameter. The specific data is set out below in Table B.

TABLE B

| Sample No. | Thickness (inches) | Aluminum Flake (wt. %) | Bulk Resistance* (ohm-cm) |
|---|---|---|---|
| 2 A Control | | 0 | $10^{16}$** |
| 2 B Control | 0.123 | 35 | 0.073 |
| 2 C Control | 0.121 | 30 | 0.093 |
| 2 D Control | 0.120 | 25 | 0.114 |
| 2 E | 0.121 | 25 | 0.049 |
| 2 F | 0.121 | 30 | 0.047 |
| 2 G | 0.121 | 30 | 0.046 |
| 2 H | 0.121 | 30 | 0.055 |
| 2 I Comparison | 0.121 | 30 | 0.179 |
| 2 J Comparison | 0.121 | 30 | 0.204 |
| 2 K Comparison | 0.121 | 30 | 0.151 |
| 2 L Comparison | 0.122 | 30 | 0.707 |
| 2 M Comparison | 0.120 | 30 | 0.133 |
| 2 N Comparison | 0.121 | 30 | 0.125 |
| 2 O | 0.122 | 30 | 0.068 |
| 2 P Comparison | 0.122 | 30 | 0.135 |
| 2 Q Comparison | 0.121 | 30 | 0.150 |
| 2 R | 0.120 | 30 | 0.034 |

*Resistance was measured using clamps having pins that penetrated the sample surface. These clamps had 5" of sample between them through which the resistance was measured. The current used was 0.25 amp and the clamping pressure on the samples was 30 ft. lb. torque in all cases.
**Typical

EXAMPLE 4

This example shows how small additions of hard, low aspect ratio filler allows for the useful amount of conductive filler, in this case aluminum flake, to be lowered greatly while retaining excellent electromagnetic interference (EMI) shielding as evidenced by low bulk resistivities. The samples in Table C below are all made from the "Matrix Premix" of Example 1. The aluminum flake was introduced as in Example 2 and injection molded plaques were made using the 175T New Britain injection molding machine as in Example 3. The notched izod, flexural strength and flexural modulus tests were all conducted according to ASTM standards. The resistivity measurements were made in accordance with the procedure mentioned in Example 3. Samples 4A, 4B and 4C are control samples containing no hard, low aspect ratio filler. Sample 4D is comparative, as the 0.1 phr amount of the filler is insufficient for enhancing sample resistivity.

TABLE C

| Sample No. | Al Flake (wt. %) | TiO2 (phr) | Resistivity (ohm-cm) | Notched Izod (ft.lb.) | Flexural Strength (psi) | Flexural Modulus ($\times 10^3$ psi) |
|---|---|---|---|---|---|---|
| 4 A Control | 40 | 0 | 0.108 | 2.45 | 6918 | 439 |
| 4 B Control | 34 | 0 | 0.134 | 3.00 | 7967 | 467 |
| 4 C Control | 29 | 0 | 0.109 | 3.33 | 7797 | 477 |
| 4 D Comparative | 27 | 0.1 | 0.137 | 4.54 | 8920 | 446 |
| 4 E | 27 | 4 | 0.023 | 3.93 | 8373 | 454 |
| 4 F | 29 | 4 | 0.009 | 3.30 | 7308 | 435 |
| 4 G | 26 | 6 | 0.005 | 3.16 | 7003 | 484 |

EXAMPLE 5

This example, in conjunction with Example 6, describes how to incorporate aluminum fibers at various loadings of hard fillers in the Matrix Premix formulation of Example 1 using a laboratory two roll mill. First the matrix components of Example 1, plus the aluminum fibers, were tumbled together. The aluminum fibers had a high aspect ratio of 320. The resulting blend was then milled as more particularly described in Example 6 herein below. Table D describes the composition of five samples as well as some properties of the hard low aspect ratio fillers used. Sample 5A is a control example which contains no hard low aspect ratio filler.

TABLE D

| Sample No. | Aluminum Fiber* (wt. %) | Filler | Filler Amount (phr) | Mean Primary Particle dia. (u) | Shape and (aspect ratio) | Typical Hardness (Moh) | Resistivity (ohm-cm) |
|---|---|---|---|---|---|---|---|
| 5 A Control | 40 | None | | | | | $10^{16}$ |
| 5 B | 40 | Mixed Metal(1) Oxide | 3 | 1.3 | Spherical (low)** | 6–7 | Insulator |
| 5 C | 40 | TiO2(2) | 3 | 0.18 | Spherical (low)** | 6–6.5 | $10^{13}$–$10^{18}$ |
| 5 D | 40 | Mixed Metal(1) Oxide | 6 | 1.3 | Spherical (low)** | 6–7 | Insulator |
| 5 E | 40 | TiO2(2) | 6 | 0.18 | Spherical (low)** | 6–6.5 | $10^{13}$–$10^{18}$ |

*The aluminum fiber used had a mean diameter of 20 microns and a mean length of ¼".
**Low aspect ratio = less than 3.
(1)A mixed metal oxide of Mn, Sb and Ti supplied under the trade designation Shepherd's No. 8.
(2)A rutile powder supplied by duPont under the trade designation R101.

EXAMPLE 6

This example shows the high electroconductivity of the compositions from Example 5, using the metal fiber conductive filler and hard low aspect ratio fillers, but compared against the same composition without said hard low aspect ratio filler. The Example 5 compositions were milled on a two roll mill at 330°–340° F. for five minutes, then the resulting milled sheet was cooled to room temperature and cut. The cut portions were compression molded using a steam heated press at 330°–340° F. The specific data for the molded samples is set out below in Table E.

TABLE E

| Sample No. | Thickness (inches) | Aluminum Fiber (wt. %) | Bulk Resistance* (ohm-cm) |
|---|---|---|---|
| 5 A Control | 0.119 | 40 | 2.752 |
| 5 B | 0.118 | 40 | 1.386 |
| 5 C | 0.118 | 40 | 1.236 |
| 5 D | 0.120 | 40 | 0.790 |
| 5 E | 0.119 | 40 | 1.397 |

*Resistance was measured in the same manner as described in Example 3.

This example demonstrates the serviceability of the invention in compression molding operation, although as noted hereinbefore, more dramatic, consistent results can be expected in other operations such as injection molding and extrusion processes.

EXAMPLE 7

The titanium dioxide described in Example 5 plus an injection molding grade of polypropylene pellets supplied by Hercules Incorporated under the trade designation Profax 6523 are blended together and then introduced to a model Buss MDK-46 kneader manufactured by Buss-Condux Incorporated. By downstream addition to the resulting plasticated mixture in the kneader, before the mixture reaches a cross head extruder, aluminum particles of principally thin flake form are introduced. More particularly the finely divided aluminum had generally tabular structure and was fairly uniform in characteristic linear dimensions, having an average thickness of about 25 microns and lengths and widths averaging about 1250 and 1000 microns respectively, such that the flake aspect ratio approximated about 50:1. The resulting flake-containing, kneaded material passed first through a cross head extruder and then a die face pelletizer. This resulted in a pelletized thermoplastic molding composition for further use, e.g., as in injection molding equipment. In Table F hereinbelow there is noted the volume percent of particulate aluminum in each pelletized sample prepared as well as the titanium dioxide amount (phr), there being no TiO2 used for the control sample.

Test sample plaques were then prepared from the corresponding pellets by injection molding through a 50 ton injection molder manufactured by Newbury Industries. Resulting test plaques were tested for bulk resistivities with bulk resistance being measured in the same manner as described in Example 3. Results are shown in Table F hereinbelow.

TABLE F

| Sample | Aluminum Flake (Volume %) | Filler Amount (phr) | Bulk Resistance (ohm-cm) |
|---|---|---|---|
| Control | 25 | 0 | 2.00 |
| Invention | 17 | 5 | 0.77 |

EXAMPLE 8

The titanium dioxide of Example 5 plus pellets of acrylonitrile-butadiene-styrene (ABS) compound supplied by Borg Warner Corp. under the trade designation Cycolac KJW were blended together in the manner described in Example 7. There was also blended together with the samples the aluminum flakes of Example 7 in the manner of Example 7 thereby producing a pelletized thermoplastic molding composition. The $TiO_2$ was not used in one sample for control purposes.

In Table G hereinbelow there is noted the volume percent of particulate aluminum in each pelletized sample prepared as well as the amount for the titanium dioxide (phr).

Test samples were then prepared from the corresponding pellets by injection molding in the manner described in Example 7. Resulting test plaques were tested in the manner described in Example 3 for bulk resistivities. Results are shown in Table G hereinbelow.

TABLE G

| Sample | Aluminum Flake (Volume %) | Filler Amount (phr) | Bulk Resistance (ohm-cm) |
|---|---|---|---|
| Control | 23 | 0 | 6 |
| Invention | 23 | 5 | 0.3 |

EXAMPLE 9

The titanium dioxide of Example 5 plus pellets of polyamide resins, more particularly a Nylon 6 supplied by duPont and a Nylon 11 supplied by Rilsan Incorporated were blended together in the manner described in Example 7. The titanium dioxide was omitted from the Nylon 6 sample for control purposes. The aluminum flake of Example 7 was also used, and the blending was in the manner of Example 7 to thereby produce pelletized material. In Table H hereinbelow there is noted the volume percent of particulate aluminum in each pelletized sample prepared as well as the amount for the titanium dioxide (phr).

Test samples were then prepared from the corresponding pellets by injection molding in the manner described in Example 7. Resulting test plaques were tested in the manner of Example 3 for bulk resistivities. Results are shown in Table H hereinbelow.

TABLE H

| Sample | Aluminum Flake (Volume %) | Filler Amount (phr) | Bulk Resistance (ohm-cm) |
|---|---|---|---|
| Control | 26 | 0 | 2.7–6.9 |
| Invention | 18.5 | 5 | 0.2–0.3 |

EXAMPLE 10

The titanium dioxide of Example 5 plus dried pellets of a flame-retardant, injection molding grade of poly(butyleneterephthalate) resin (PBT) supplied by General Electric Corporation under the trade designation Valox 310 SEO, as well as powdered acrylic resin impact modifier supplied by Rohm and Haas under the trade designation KM 330 were preblended together in a low intensity batch mixer. The titanium dioxide was omitted from one sample for control purposes. Thereafter the blend was kneaded together in the manner of Example 7, with the aluminum flake of Example 7 being added downstream in the kneader, to thereby produce pelletized material. In Table I hereinbelow there is noted the volume percent of particulate aluminum in each pelletized sample prepared as well as the amount for the titanium dioxide (phr). In the control, the weight ratio of the acrylic resin to the PBT was 6:61 and for the invention sample was 5.75:60.

Test sample plaques were then prepared from the corresponding pellets by injection molding in a 175 ton New Britain injection molder. Resulting test plaques were tested as discussed in Example 3 for bulk resistivities. Results are shown in Table I hereinbelow.

TABLE I

| Sample | Aluminum Flake (Volume %) | Filler Amount (phr) | Bulk Resistance (ohm-cm) |
|---|---|---|---|
| Control | 18.5 | 0 | 0.03–0.05 |
| Invention | 22 | 1.33 | 0.006–0.007 |

EXAMPLE 11

The titanium dioxide powder of Example 5, or a mixed metal oxide in its place, plus pellets of flame-retardant, injection molding grade ABS compound supplied by Borg Warner under the trade designation Cycolac KJB were melt blended in a 1½-inch compounding extruder. The titanium dioxide and mixed metal oxide were omitted from one sample for control purposes. The mixed metal oxide used was either a blue oxide of chromium, cobalt and aluminum supplied under the trade designation Shepherd's No. 190, or a brown oxide of iron and titanium supplied under the trade designation Shepherd's No. 8. For both the control and invention samples there was blended, with the foregoing ingredients, sized stainless steel fibers (type 316L stainless steel) having a mean minimum characteristic linear dimension (diameter) of 8 microns. The melt blended material next passed through a strand die, was subsequently water cooled and then pelletized.

In Table J hereinbelow there is noted the volume percent of stainless steel fiber in each pelletized sample prepared as well as the filler amount (phr) and type used. Test samples were then prepared from the corresponding pellets by injection molding in the manner described in Example 7. Resulting test plaques were tested in the manner described in Example 3 for bulk resistivities. Results are shown in Table J hereinbelow.

TABLE J

| Sample | Stainless Steel Fiber (Volume %) | Filler | Filler Amount (phr) | Bulk Resistance (ohm-cm) |
|---|---|---|---|---|
| Control | 1.3 | None | 0 | 1.8-2.4 |
| Invention | 1.3 | TiO2 | 3 | 0.53-0.56 |
| Invention | 1.3 | Blue Mixed Metal Oxide | 3 | 0.85-0.92 |
| Invention | 1.3 | Brown Mixed Metal Oxide | 3 | 0.77-0.92 |

EXAMPLE 12

The control for this example was prepared from the PBT resin pellets plus acrylic resin powder impact modifier, both described in Example 10, together with the aluminum flake of Example 7. The weight ratio for acrylic resin powder to PBT resin pellets in the control sample was 6:61. For the invention sample there was used the titanium dioxide powder of Example 5, in a weight ratio to the acrylic resin powder of 5:23. There was then used ten weight percent of this powder combination with a 90 weight percent balance of PBT resin pellets. To this there was further blended the aluminum flake of Example 7. For both the control and the invention samples, ingredients were melt blended and pellets prepared all in the manner of Example 2.

In Table K hereinbelow there is noted the volume percent of particulate aluminum in each pelletized sample prepared. Also noted in the table is the titanium dioxide amount of the invention sample, as a weight amount, basis total sample weight. Test samples were then prepared from the corresponding pellets by injection molding in the manner described in Example 7. Resulting test plaques were tested in the manner described in Example 3 for bulk resistivities. Results are shown in Table K hereinbelow.

TABLE K

| Sample | Aluminum Flake (Volume %) | Filler Amount (wt. %) | Bulk Resistance (ohm-cm) |
|---|---|---|---|
| Control | 20.2 | 0 | 44.3 |
| Invention | 19.7 | 2.2 | 5.8 |

As noted, bulk resistance improvement is dramatic. It is however of interest to compare these results with those obtained in Example 10, wherein the processing means lead to much less crushing of the electroconductive particles when compared to the operations of this example.

What is claimed is:

1. An electroconductive resinous composition having improved electroconductivity based on the amount of electroconductive fillers therein for preparing electroconductive molded or extruded articles, said composition comprising a cementitious resinous matrix having fillers uniformly dispersed within, said fillers comprising a mixture of electroconductive high aspect ratio filler in an amount equal to from 0.1% to 40% by volume, said high aspect ratio being greater than 10/1, and a low aspect ratio filler in an amount between 0.1 and 15 parts per hundred (resin), said low aspect ratio being less than 10/1.

2. an electroconductive resinous composition as stated in claim 1 wherein said high aspect ratio is between 10/1 and 3000/1 and said low aspect ratio is less than 3/1.

3. An electroconductive resinous composition as stated in claim 2 wherein said low aspect ratio is approximately 1/1.

4. An electroconductive resinous composition as stated in claims 1, 2 or 3 wherein the smallest dimension of said high aspect ratio filler has a mean value between 0.1 and 100 microns and the smallest dimension of said low aspect ratio filler has a mean value between 0.1 and 25 microns.

5. An electroconductive resinous composition having improved electroconductivity based on the amount of electrocoductive fillers therein for preparing electroconductive molded or extruded articles, said composition comprising a cementitious resinous matrix having fillers uniformly dispersed within, said fillers comprising a mixture of electroconductive high aspect ratio filler in an amount equal to from 0.1% to 40% by volume, said high aspect ratio being greater than 10/1, and a hard low aspect ratio filler having a Moh hardness of from 4 to 10 in an amount between 0.1 and 15 parts per hundred (resin), said low aspect ratio being less than 10/1.

6. An elecroconductive resinous composition as stated in claim 5 wherein said high aspect ratio is between 10/1 and 300/1 and said low aspect ratio is less than 3/1.

7. An electroconductive resinous composition as stated in claim 6 wherein said low aspect ratio is approximately 1/1.

8. An electroconductive resinous composition as stated in claims 5, 6 or 7 wherein teh smallest dimension of said high aspect ratio filler has a mean value between 0.1 and 100 microns and the smallest dimension of said low aspect ratio filler has a mean value between 0.1 and 25 microns.

9. An electroconductive resinous composition having improved electroconductivity based on the amount of electroconductive fillers therein for preparing electroconductive molded or extruded articles, said composition comprising a cementitious resinous matrix having fillers uniformly dispersed within, said fillers comprising a mixture of electroconductive high aspect ratio filler in an amount equal to from 0.1% to 40% by volume, said high aspect ratio being greater than 10/1, and a non-electroconductive low aspect ratio filler in an amount between 0.1 and 15 parts per hundred (rasin), said low aspect ratio being less than 10/1.

10. An electroconductive resinous composition as stated in claim 9 wherein said high aspect ratio is between 10/1 and 300/1, and said low aspect ratio is less than 3/1.

11. An electroconductive resinous composition as stated in claim 10 wherein said low aspect ratio is approximately 1/1.

12. An electroconductive resinous composition as stated in claims 11 wherein the smallest dimension of said high aspect ratio filler has a mean value between 0.1 and 100 microns and the smallest dimension of said low aspect ratio filler has a mean value between 0.1 and 25 microns.

13. An electroconductive resinous composition as stated in claim 12 wherein said hard low aspect ratio filler is present in an amount between 0.2 and 10 parts per hundred (resin).

14. An electroconductive resinous composition having improved electroconductivity based on the amount of electroconductive fillers therein for preparing electroconductive molded or extruded articles, said composition comprising a cementitious resinous matrix having fillers uniformly dispersed within, said fillers comprising a mixture of electroconductive high aspect ratio filler in an amount equal to from 0.1% to 40% by volume, said high aspect ratio being greater than 10/1, and a low aspect ratio filler selected from the group consisting of metal oxides such as from cobalt, aluminum, chromium, iron, zinc, titanium, manganese, antimony, nickel or copper; mixed metal oxides of the said metal oxides; silicon oxides, metal carbides, silicon carbides; and particulate glass, in an amount between 0.1 and 15 parts per hundred (resin), said low aspect ratio being less than 10/1.

15. An electroconductive resinous composition as stated in claim 14 wherein said high aspect ratio is between 10/1 and 300/1 and said low aspect ratio is less than 3/1.

16. An electroconductive resinous composition as stated in claim 15 wherein said low aspect ratio is approxiamtely 1/1.

17. An electroconductive resinous composition as stated in claim 16 wherein the smallest dimension of said high aspect ratio filler has a mean value between 0.1 and 100 microns and the smallest dimension of said low aspect ratio filler has a mean value between 0.1 and 25 microns.

18. An electroconductive resinous composition as stated in claims 14, 15, 16 or 17 wherein said hard low aspect ratio filler is present in an amount between 0.2 and 10 parts per hundred (resin).

19. An electroconductive resinous composition as stated in claim 1 wherein said mixture of electroconductive high aspect ratio filler comprises flake aluminum or aluminum fibers in an amount equal to from 20% to 40% by volume, said high aspect ratio being greater than 10/1, and a low aspect ratio filler comprising titanium dioxide in an amount between 1 and 5 parts per hundred (resin), said low aspect ratio being less than 3/1.

20. An electroconductive resinous composition as stated in claim 19 wherein said low aspect ratio is approximately 1/1.

21. An electroconductive resinous composition as stated in claims 19 or 20 wherein the smallest dimension of said high aspect ratio filler has a mean value between 0.1 and 100 microns and the smallest dimension of said low aspect ratio filler has a mean value between 0.1 and 25 microns.

* * * * *